(12) United States Patent
Swanson et al.

(10) Patent No.: US 9,367,327 B2
(45) Date of Patent: Jun. 14, 2016

(54) METHOD TO ENSURE PLATFORM SILICON CONFIGURATION INTEGRITY

(75) Inventors: Robert C. Swanson, Olympia, WA (US); Nimrod Diamant, Kfar-Saba (IL); Vincent Zimmer, Federal Way, WA (US); Millik Bulusu, Olympia, WA (US)

(73) Assignee: INTEL CORPORATION, Santa Clara, CA (US)

( * ) Notice: Subject to any disclaimer, the term of this patent is extended or adjusted under 35 U.S.C. 154(b) by 245 days.

(21) Appl. No.: 12/889,852

(22) Filed: Sep. 24, 2010

(65) Prior Publication Data

US 2012/0079259 A1 Mar. 29, 2012

(51) Int. Cl.
*G06F 9/00* (2006.01)
*G06F 9/44* (2006.01)
*G06F 21/57* (2013.01)

(52) U.S. Cl.
CPC ............ *G06F 9/4401* (2013.01); *G06F 21/575* (2013.01); *G06F 2221/2153* (2013.01)

(58) Field of Classification Search
CPC .............................. G06F 9/4401; G06F 9/4406
USPC ................. 713/1, 191, 193, 155, 2, 322, 323; 702/186; 700/81
See application file for complete search history.

(56) References Cited

U.S. PATENT DOCUMENTS

| | | | |
|---|---|---|---|
| 5,167,024 A * | 11/1992 | Smith et al. | 713/322 |
| 6,487,465 B1 * | 11/2002 | Dayan et al. | 700/81 |
| 6,684,326 B1 | 1/2004 | Cromer et al. | |
| 6,718,461 B1 * | 4/2004 | Ewertz | 713/1 |
| 6,782,349 B2 * | 8/2004 | Challener et al. | 702/186 |
| 8,190,916 B1 * | 5/2012 | Wang et al. | 713/193 |
| 8,296,554 B2 * | 10/2012 | Mirashrafi et al. | 713/1 |
| 2002/0157010 A1 * | 10/2002 | Dayan et al. | 713/191 |
| 2004/0024556 A1 | 2/2004 | Wang | |
| 2005/0132177 A1 * | 6/2005 | Challener et al. | 713/1 |
| 2005/0268081 A1 | 12/2005 | Han et al. | |
| 2007/0118768 A1 * | 5/2007 | Wolford | 713/193 |
| 2007/0208928 A1 * | 9/2007 | Rios | G06F 9/4401 713/1 |

(Continued)

FOREIGN PATENT DOCUMENTS

| KR | 10-0621095 B1 | 9/2006 |
|---|---|---|
| KR | 10-2010-0080390 A | 7/2010 |

(Continued)

OTHER PUBLICATIONS

"Notification of Transmittal of the International Search Report and the Written Opinion of the International Searching Authority, or the Declaration", dated Mar. 28, 2012, for International Application No. PCT/US2011/053165, 8pgs.

(Continued)

*Primary Examiner* — Aurel Prifti
(74) *Attorney, Agent, or Firm* — Buckley, Maschoff & Talwalkar LLC

(57) ABSTRACT

Some aspects include beginning a power on self test (POST) by a BIOS for a computer system; enumerating the computer system by the BIOS; providing, based on the enumeration of the computer system by the BIOS, at least one configuration setting of the computer system to a management engine (ME) of the computer system; and applying a lock to the at least one configuration setting by the ME to manage a change to the at least one configuration setting, all prior to an ending of the POST.

11 Claims, 4 Drawing Sheets

(56) References Cited

U.S. PATENT DOCUMENTS

| | | | |
|---|---|---|---|
| 2008/0244257 A1* | 10/2008 | Vaid et al. ............................ | 713/2 |
| 2009/0144533 A1* | 6/2009 | Mulcahy et al. ................... | 713/2 |
| 2009/0172444 A1* | 7/2009 | Wang et al. ...................... | 713/323 |
| 2010/0011201 A1* | 1/2010 | Ahn et al. .......................... | 713/2 |
| 2010/0169640 A1* | 7/2010 | Smith et al. ...................... | 713/155 |
| 2010/0275045 A1* | 10/2010 | Qin et al. ......................... | 713/322 |
| 2011/0145558 A1 | 6/2011 | Khosravi et al. | |
| 2013/0159690 A1* | 6/2013 | Tsukamoto ............... | G06F 1/26 713/2 |

FOREIGN PATENT DOCUMENTS

| | | |
|---|---|---|
| TW | 559672 B | 11/2003 |
| TW | 584800 B | 4/2004 |
| TW | 200910137 A | 3/2009 |

OTHER PUBLICATIONS

"Taiwanese Search Report and English-language translation" dated Jun. 27, 2015, for R.O.C. Patent Application No. 100134349, 2pgs.

* cited by examiner

METHOD TO ENSURE PLATFORM SILICON CONFIGURATION INTEGRITY

BACKGROUND

A computer system or platform may typically include a processor, chipset, memory, one or more input/output (I/O) devices, and other integrated components. Increasingly, computer platforms may comprise discrete components and firmware elements from a number of different providers such as independent hardware vendors, original equipment manufacturers, independent BIOS (Basic Input/Output System) vendors, and others. Based on a number of factors, including but not limited to open platform designs, manufacturing costs, and security concerns, silicon manufacturers are, in some instances, increasingly integrating more discrete components from a variety of sources into the main silicon and/or firmware of a system platform.

A concern that may be raised by integrating discrete components and firmware elements from a number of different sources into a computer system is how to ensure a safe, reliable, and secure operation of the platform. In a number of computer architectures, an initialization and configuration of the computer system is performed by the BIOS during a pre-boot or initialization phase before an OS (operating system) is executed. In some instances, an undesired execution of code (e.g., malicious attacks) during the initialization phase may result in a compromise in the reliability, security, and other factors associated with the subsequent operation of the OS and the platform. Such platform compromises may include memory attacks (e.g., cache attacks and/or dedicated memory attacks), component configuration downgrade attacks, and denial of service (DoS) attacks. Accordingly, there exists a need to provide a mechanism to ensure platform silicon configuration integrity.

DETAILED DESCRIPTION

Figure 1:
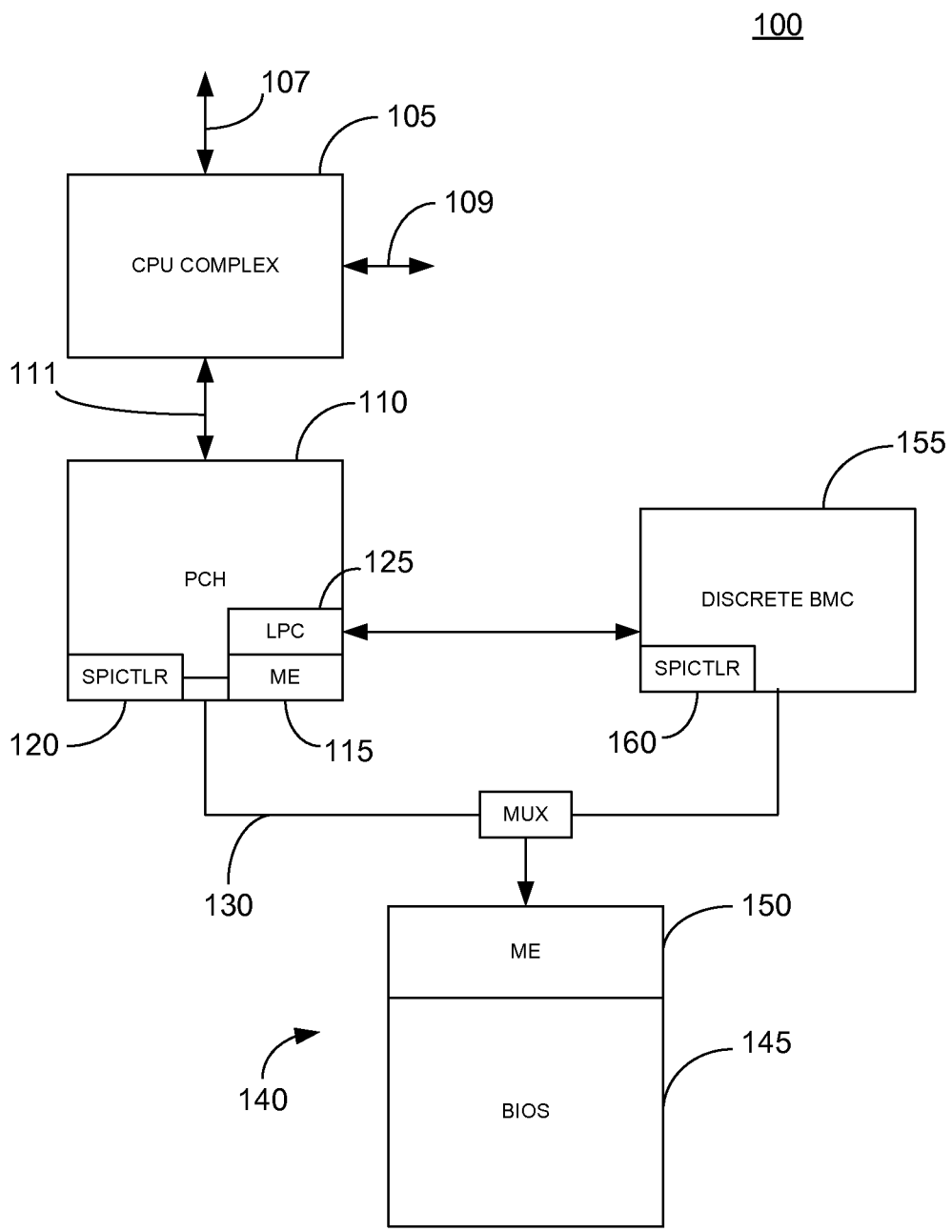
FIG. 1 is a block diagram of a system according to some embodiments.

The disclosed embodiments herein may be best understood by reference to the accompanying drawings. The following description is intended to provide an example, to illustrate certain selected embodiments of devices, systems, and processes that are consistent with the invention as claimed herein.

It will be understood that the components of the present disclosure, as generally described and illustrated in the drawings herein, may be arranged and designed in a wide variety of different configurations. The following detailed description of some embodiments of the apparatus, system, and method of the present disclosure, as represented in FIGS. 1 through 4, is not intended to limit the scope of the invention, as claimed, but is merely representative of some embodiments thereof.

Reference throughout this disclosure to "one embodiment", "some embodiments", or "an embodiment" (or the like) means that a particular feature, structure, or characteristic described in connection with the embodiment is included in at least one embodiment of the present invention. Thus, appearances of the phrases "in one embodiment", "in some embodiments", or "in an embodiment" in various places throughout this disclosure are not necessarily all referring to the same embodiment.

Furthermore, the described features, structures, or characteristics may be combined in any practicable and suitable manner, configuration and order, in one or more embodiments. In the following description, numerous specific details are provided, such as examples of programming, software modules, user selections, network transactions, commands, command protocols, hardware modules, hardware circuits, hardware chips, etc., to provide a thorough understanding of embodiments hereof. One skilled in the relevant art(s) will recognize, however, that the invention can be practiced without one or more of the specific details, or with other methods, components, materials, etc. In some instances, well-known structures, materials, or operations are not shown or described in detail to avoid obscuring aspects of the present disclosure.

FIG. 1 provides an illustrative overview block diagram of an embodiment of an apparatus, a computer system or platform topology 100. The computer platform depicted in FIG. 1 may be a server, desktop, workstation, a notebook computer system, a mobile computing device, and other devices and apparatuses. As shown, computer platform 100 includes a host CPU complex 105. CPU complex 105 may be one of a plurality of CPU complexes interconnected to platform 100. In some embodiments, one or more additional CPU packages (not shown) may be interconnected to platform 100 at links 107 and 109. CPU complex 105 may include or be coupled to a Read-Only Memory (ROM) and a system memory (not shown). CPU complex 105 may include a general-purpose processor that executes boot code stored within the ROM at power-on and thereafter processes data under the control of the Operating System (OS) and application software stored in the system memory or ROM or other fixed or networked storage. CPU complex 105 may include a number of functional components such as a plurality of processor cores, an integrated memory controller (IMC), an integrated graphics device (IGD), a cache, and a processor interface for facilitating communication with other devices such as, for example, a memory subsystem (not shown) and a platform controller hub (PCH) 110. In some instances the platform may be comprised of a chip where the platform controller hub is logical in nature. This configuration is most common in system on a chip designs.

PCH 110 may include, in some embodiments, functionality for providing a ME (management engine) 115, SPI (serial peripheral interface) controller 120 for connecting to a flash ROM 140 over SPI bus 130. Flash ROM 140 may provide storage for and access to BIOS memory registers 145 and ME memory registers 150 that may be accessed and used by ME 115. In some aspects, PCH 110 may include a real time clock that provides a persistent time clock to the chipset. In some embodiments, ME 115 is the owner and controller of the clock signal generation and output enables associated with the clock.

In one embodiment, PCH includes a LPC (low pin count) bridge 125 to provide data and control to other components such as, for example, BMC (baseboard management controller) 155. In the illustrated embodiment of FIG. 1, the discrete BMC 150 is shown coupled to SPI bus 130 by a SPI controller 160 to access flash ROM 140. BMC 155 may manage the interface between system management software and platform hardware.

It should be appreciated that the systems and methods disclosed herein may be implemented with different chip sets and different bus structures, as well as with any other suitable substitute components, other than those particularly illustrated and depicted herein. However, such variations may still provide comparable or analogous functions to those disclosed herein. As presented herein, system 100 of FIG. 1 provides but one illustrative and non-restrictive example of systems that can employ an ME in accordance with embodiments of the present invention. Other computer systems, platforms, computing devices, and system architectures may include a ME, including systems having different bus implementations and chipset implementations and characteristics other than the particular embodiment of FIG. 1. In some embodiments, the ME can be physically contained within a separate execution block or abstracted via virtualization, yet the ME may still have the ability to monitor the platform hardware state. The ME may be a separate microcontroller. In some embodiments, the ME may be a partition on system on a chip or a HW state machine, which will not allow the system to execute if certain "signatures" are not valid.

Figure 2:
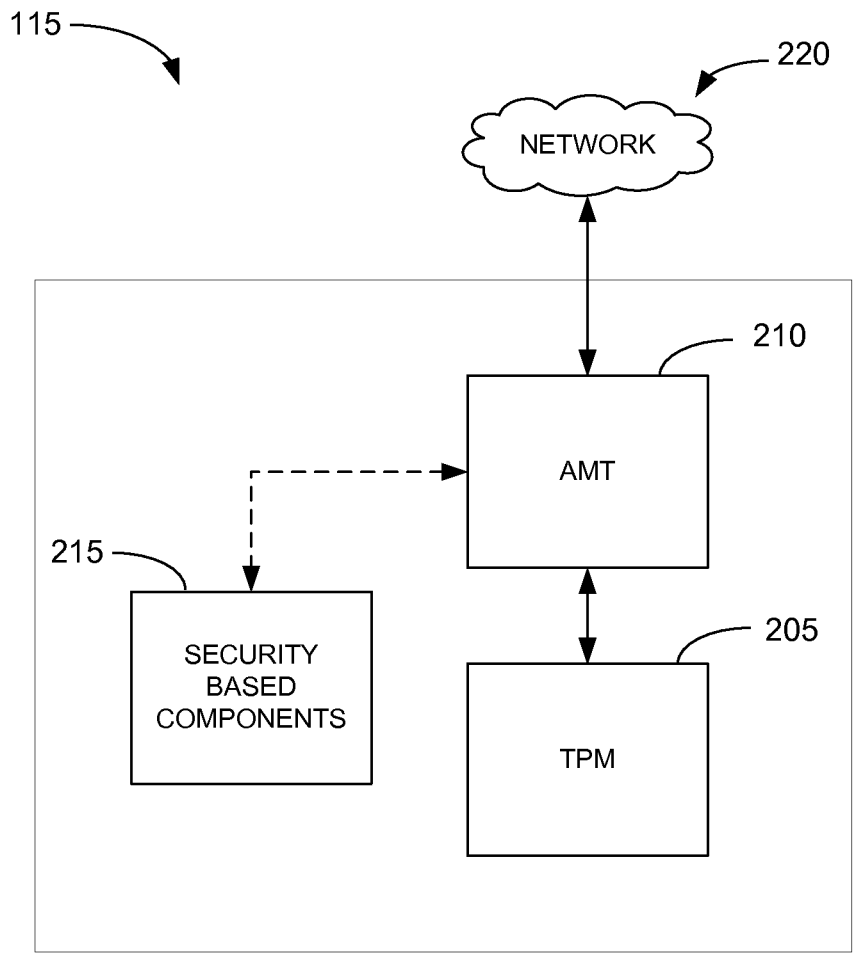
FIG. 2 is a block diagram representation of a ME components according to some embodiments.

FIG. 2 depicts an illustrative block diagram of ME 115 in accordance with some embodiments herein. In some embodiments, ME's such as those manufactured by Intel, Inc. (the assignee of the present disclosure), may include one or more associated components. The associated components may be intergraded with the ME to more effectively and efficiently manage and isolate security aspects of a computer platform or architecture. Referring to system 100 of FIG. 1, ME 115 may be located on or interfaced with other components of computer platform 100 such as CPU complex 105 via the DMI (Direct Media Interface) bus 111 as shown.

In some aspects, since ME 115 can communicate directly with CPU complex 105 via DMI bus 111, MCTP (Management Component Transport Protocol) messages over PCIe (Peripheral Component interconnect Express), PECI (Platform Environment Control Interface) bus, or QPI (QuickPath Interconnect), the ME can directly determine whether a secure configuration is performed during an initialization of the platform. The ME may also periodically poll the silicon components to ensure their configuration remains secure at runtime.

ME 115 may include a Trusted Platform Module (TPM) 205 or similar functionality, Active Management Technology (AMT) 210 such as, for example, Intel® AMT, and one or more security-based components 215. TPM 205 may include a privileged register(s) that can securely store the identity and or associated values of a firmware system. TPM 205 may also be configured to generate cryptographic keys, manage access to such keys, and may perform functions such as remote attestation, binding, and/or sealed storage. ME 115 is a microcontroller that functions as an independent execution engine. ME 115 may include register(s) (not shown), that may be implemented as a write once register that requires a system reset to rewrite the register. In some aspects, ME 115 may be configured to measure firmware or other code, for instance, by reading firmware code and performing functions to verify ownership and/or the binary integrity of firmware. In the illustrated embodiments herein, ME 115 is configured to access BIOS memory 145 in flash ROM 140 over SPI bus 130 via SPI controller 120.

An independent detailed discussion of the operation of AMT 210 (e.g., Intel® AMT, iAMT) is not provided herein as such background information is either known and/or accessible by those skilled in the relevant arts associated with the present disclosure.

Generally, an AMT such as iAMT may contain a ME that is a service processor, dedicated firmware for the service processor, and logic in an Ethernet and/or 802.11 and/or WAN controller to allow the ME to communicate with other locations across the internet even when the system is off. Accordingly, one may send commands to ME 115, and the ME can process and return commands whether the main operating system (OS) is running or not running. Thus, ME 115 enables contact with a network 220 even when the system is technically off. The network interface can be realized directly or indirectly via essentially any suitable arrangement, e.g., a network adapter.

In accordance with at least one embodiment of the present disclosure, contemplated herein are arrangements for providing an architectural mechanism to protect the computer platform from unauthorized, improperly coded, or an otherwise compromised BIOS and protection from an OS level attack. In general, the present disclosure provides the ME as an arbiter of protection against, for example, the loading of improperly coded BIOS, and protection from OS level attacks. ME 115 may pre-determine the configuration settings considered important or otherwise relevant parameters for ensuring proper configuration to protect the platform from attacks. In some embodiments, the BIOS may have the responsibility to lock down the pre-determined configurations of the platform prior to the completion of a power-on self test (POST) of the platform. In an instance the BIOS does not lock down the appropriate settings that have been pre-determined or are otherwise known, the appropriate configuration settings (i.e., bits) may be locked down by the ME. Furthermore, any attempt to unlock the configuration settings can be blocked by the ME until a platform reset occurs. A platform reset allows the system to be reconfigured by BIOS. BIOS will then have the ability to correctly lock the configuration. If it fails to keep the platform configured properly, the ME will again lock the associated configuration to avoid vulnerabilities.

Variations to the configurations illustrated in FIGS. 1 and 2 are possible. For example, in an alternative embodiment, the server chipset 110 may include more than one memory controller. Furthermore, ME 200 and/or the TPM 205 may exist separate and apart from the PCH 110 and with more than one PCH in some embodiments.

Figure 3:
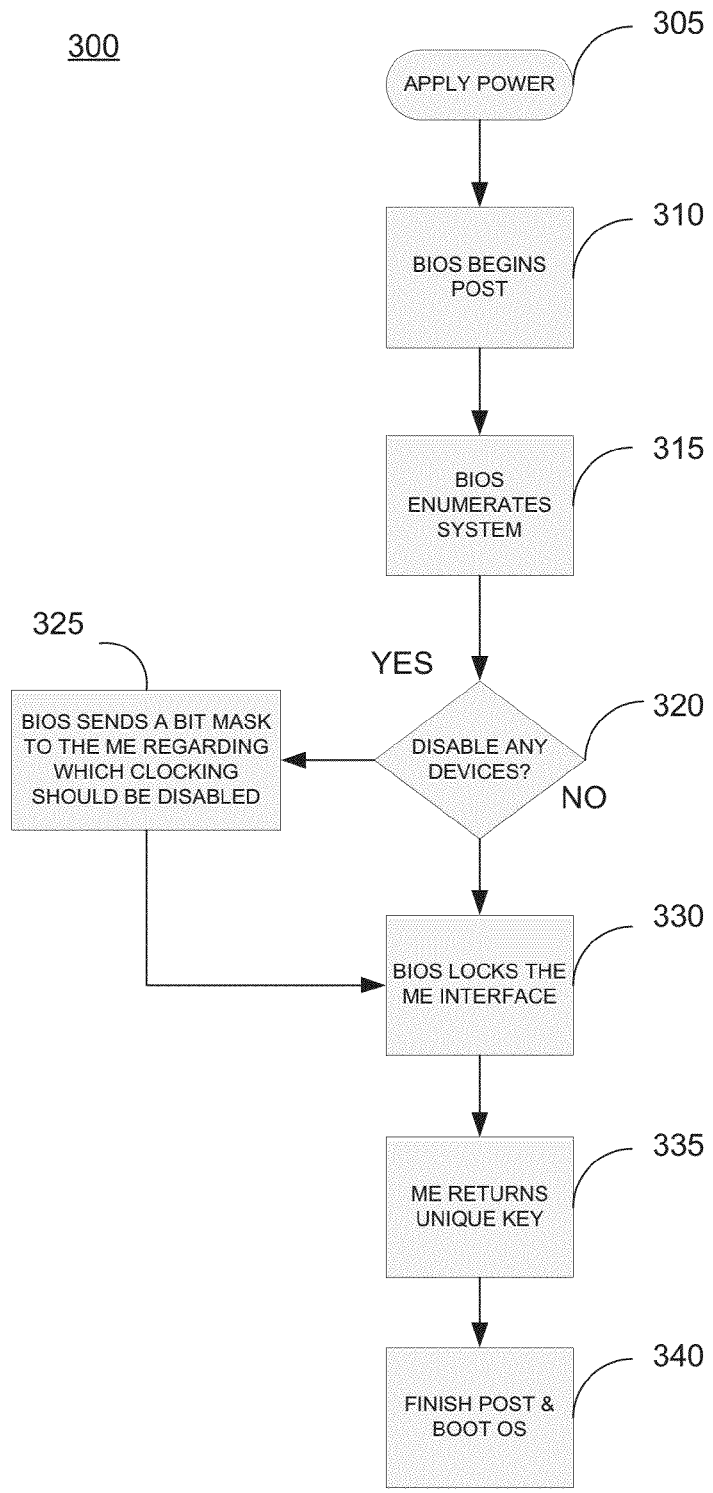
FIG. 3 is a flow diagram of a process according to some embodiments.

Computer (e.g., server) platform 100 illustrated in FIG. 1 and described above may be configured to perform the process illustrated in FIG. 3 and described below. FIG. 3 is a flow diagram of a computer platform process 300, according to an embodiment herein. After the computer platform is powered up at operation 305, the platform is reset. Resetting the platform causes ME 115 to enable all clock outputs. In some embodiments, ME 115, acting per the ME firmware it executes, is the owner of the clock signal generation and the output enables for the clock. At operation 310, the BIOS is loaded and initiates a power on self test (POST). The BIOS proceeds to enumerate the PCI subsystem at 315. The BIOS enumerates all devices on the PCI bus to ascertain which devices are currently present in the system.

At conditional operation 320, a determination is made regarding whether any devices should be disabled. The determination is made based on the BIOS enumeration of operation 315. Based on the enumeration, the BIOS will know which devices should be disabled. Disabling of the devices can be controlled by the ME disabling the appropriate clock signals.

In the instance every device corresponding to all of the clock outputs enabled by the ME are determined to be present and should be configured for operation (i.e., enabled), then none of the devices may be disabled and all are instead left enabled. In the instance no devices are to be disabled, process 300 proceeds to operation 330. In the event one or more devices are to be disabled, process 300 proceeds to 325 where the BIOS writes a bit-field of the registers indicating the particular registers that should be locked. The indication of which registers should be locked is passed to the ME at 330. In some embodiments, the indication of which registers should be locked is provided to the ME in a HECI (Host Embedded Controller Interface) LOCK command over a HECI bus that provides direct communication between the Host OS and the ME. Upon receipt of this HECI LOCK command, the ME will apply a security layer upon the indicated registers.

The ME may thus control the clock signal generation and disable clocks for the devices that should not be enabled. The ME, as an integrated watcher or arbiter against improperly or maliciously coded BIOS, can pre-determine which configuration settings are important to protect the platform from OS level attacks.

In some aspects, process 300 proceeds to operation 335 where the ME generates a unique key and returns it to the BIOS. Thereafter, all future commands to access the BIOS, whether to make changes, view configuration settings, etc., can be ignored if the commands do not include the unique key. In some embodiments, the unique key may be generated during each POST. In some embodiments, the unique key of operation 335 may be generated at other intervals, where the interval may be based on a time interval between key generations, system resets, or other events.

At 340 process 300 finishes the POST operation and the BIOS is executed to boot the OS. In some embodiments, if the LOCK command is not received by an END_OF_POST notification, then all commands will be locked, including BIOS generated commands.

In some embodiments for platforms that do not support integrated clocking provided directly by the ME, a bus (e.g., SMBus) controller connecting the clock generator (e.g., clock chip) may be multiplexed with the END_OF_POST assertion. In the event the BIOS does not provide a "lock" command, the ME with hardware support, may latch the clock signal with a write once signal line. In this manner, future bus writes to the clock generator may be blocked.

Figure 4:
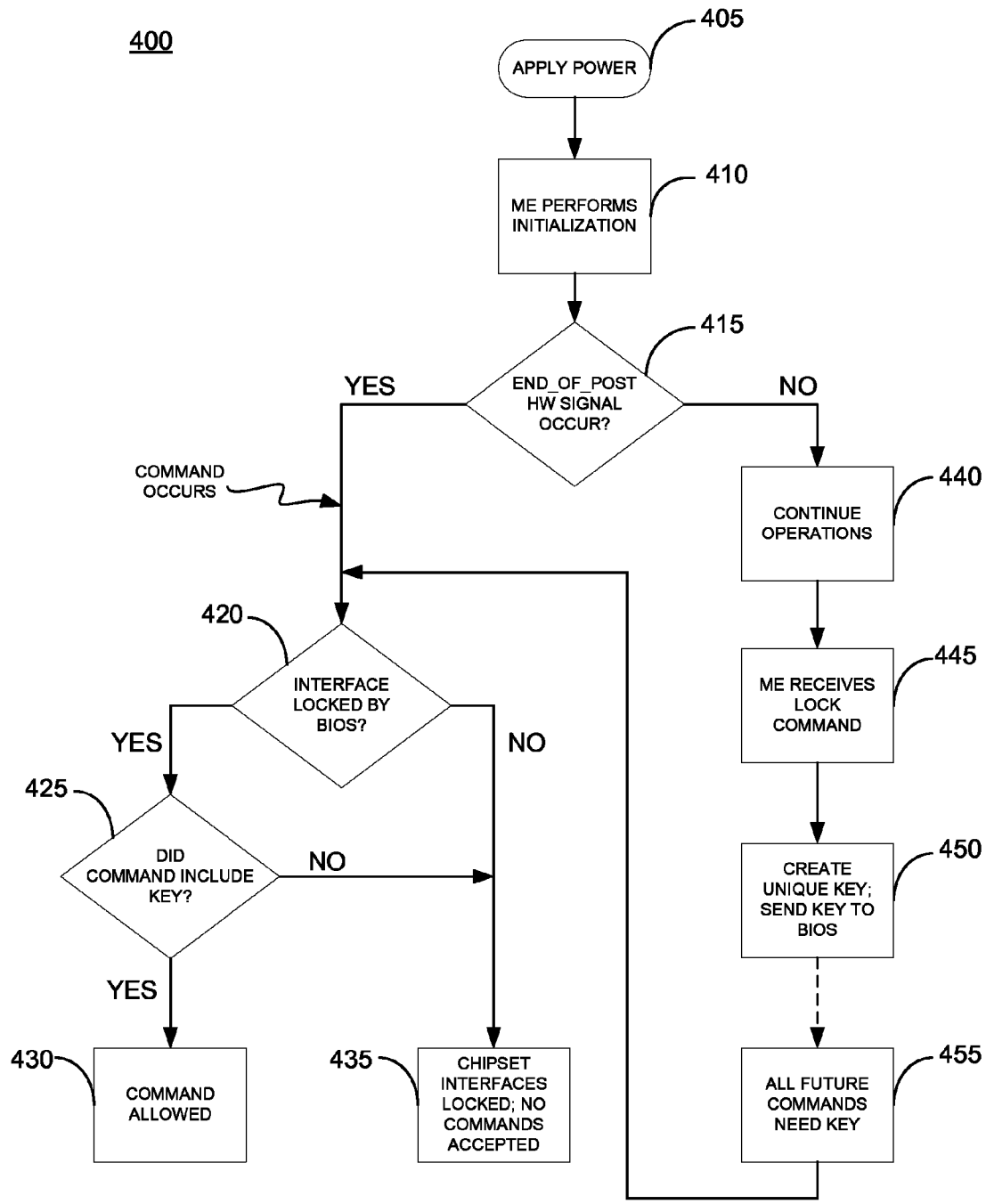
FIG. 4 is a flow diagram of a process according to some embodiments.

FIG. 4 is an illustrative flow of a process 400, in accordance with embodiments herein. In some aspects, process 400 corresponds with process 300 of FIG. 3 where process 300 is from a perspective of the BIOS and Host and where process 400 is from a perspective of the ME. At operation 405, the computer platform is powered up and the platform is reset. At operation 410, the ME performs an initialization and responds to HECI commands, in particular integrated clock (iClock) commands although other commands are possible.

At conditional operation 415, a determination is made regarding whether an END_OF_POST hardware signal has occurred. In the event an END_OF_POST signal has occurred, then a determination is made, after a HECI command occurs, whether the BIOS locked the configuration at operation 420. If the BIOS locked the configuration, then a determination is made at operation 425 of whether the command includes a requisite key. If the command received after the END_OF_POST at 415 includes the requisite key, then the command is accepted and acted upon at operation 430. In the event the command does not include the requisite key, then the chipset interfaces may be locked, the command is not accepted at operation 435, and the key will not be generated and issued for this POST. In this manner, it is seen that in the instance the BIOS fails to properly lock the relevant configuration settings, then the ME can block execution of future commands.

Returning to decision point 415, if the END_OF_POST hardware signal has not occurred flow continues to operation 440 and operation of the platform continues. At 445, the ME receives a LOCK command and proceeds to create a unique key (without loss of generality, a random generated DWORD key) at operation 450 from the ME kernel services and store the encrypted value. The unique key is further sent to the BIOS for use in determining whether to accept future communication commands, as indicated at operation 455. Thereafter, flow continues to a point before operation 420. Upon the occurrence of a HECI command, the ME then operates to flow to operations 420 through 435 as previously described above.

In some embodiments, if three or some other determined or set number of commands, including clock commands but not limited thereto, are received without the unique key of operation 335, the ME may provide an alert or other indication of such activity. The alert may be provided to a system administrator and may include local and remote notifications. In addition to, in conjunction with, or in substitute of providing the alert to the system administrator, commands may be ignored for a period of time (e.g., 60 seconds), the computer system may be (optionally) reset in a controlled manner, and other security measures may be taken.

In some embodiments, a platform may have all discrete TPM devices utilize integrated clocking controlled by the ME. Furthermore, in one embodiment actions such as ME UMA (Upper Memory Area) locking may be protected using aspects of the present disclosure. For example, the ME of a platform system may prevent the system from booting in the event its UMA memory range is not hidden by MESEG and protected from HOST snooping. A "snoop" may be implemented by using, for example, a bus (e.g., DMA) access of the PCH (or generically, a south bridge control hub) of the platform. If a DMA access can read the ME UMA memory using a non-GPDMA (general purpose DMA) engine, then the BIOS did not properly lock the ME UMA. In response to the ME UMA being visible, the platform may be prevented from booting.

In some embodiments, the key generated by the ME to further secure and guarantee the integrity of the computer platform as illustrated and provided by process 300 and 400 will not be given to the HOST system. Accordingly, the system OS will not be able to obtain the key. In this manner, computer platform 100 may be protected from OS attacks.

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

What is claimed is:

1. A method comprising:
   beginning a power on self-test (POST) by a Basic Input/Output System (BIOS) for a computer system;
   enabling all clock outputs of a computer system by a management engine (ME) of the computer system, the ME being a microcontroller distinct from the BIOS comprising an architectural component of a platform of the computer system;
   enumerating the computer system by the BIOS to ascertain all devices present in the computer system;
   providing, based on the enumeration of the computer system by the BIOS, at least one configuration setting of the computer system to the ME of the computer system;
   applying a lock, in accordance with the at least one configuration setting, by the ME to manage a change to the at least one configuration setting to disable at least one of the devices present in the computer system in response to the BIOS being not fully locked down to the computer system in accordance with the at least one configuration setting, all prior to an ending of the POST; and generating a unique key by the ME, wherein a bus command to access the at least one configuration setting includes the key.

2. The method according to claim 1, wherein the bus command conforms to a Host Embedded Controller Interface (HECI) specification.

3. The method of claim 1, wherein the BIOS determines the at least one configuration setting based on the enumeration.

4. The method of claim 1, wherein the ME operates under control of ME firmware.

5. The method of claim 1, wherein the key is not shared with a host system.

6. An apparatus comprising:
a CPU complex including at least one processor core;
a Basic Input/Output System (BIOS); and
a platform controller hub (PCH) including a management engine (ME), the ME being a microcontroller distinct from the BIOS and interfaced with the CPU complex comprising an architectural component of a platform of the computer system, where the CPU complex, BIOS, and ME are operative to:
begin a power on self-test (POST) by the BIOS for the apparatus;
enabling all clock outputs of a computer system by a management engine (ME) of the computer system;
enumerate the apparatus by the BIOS to ascertain all devices present in the computer system;
provide, based on the enumeration of the apparatus by the BIOS, at least one configuration setting of the apparatus to the ME;
apply a lock, in accordance with the at least one configuration setting by the ME to manage a change to the at least one configuration setting to disable at least one of the devices present in the computer system in response to the BIOS being not fully locked down to the computer system in accordance with the at least one configuration setting, all prior to an ending of the POST; and
generate a unique key by the ME, wherein a bus command to access the at least one configuration setting includes the key.

7. The apparatus of claim 6, wherein the bus command conforms to a Host Embedded Controller Interface (HECI) specification.

8. The apparatus of claim 6, wherein the BIOS determines the at least one configuration setting based on the enumeration.

9. The apparatus of claim 6, wherein the ME includes ME firmware that controls operation of the ME.

10. The method of claim 1, wherein the ME controls clock signal generation for a clock of the computer system and output enables for the clock.

11. The apparatus of claim 6, wherein the ME controls clock signal generation for a clock of the computer system and output enables for the clock.

* * * * *